(12) United States Patent
Park et al.

(10) Patent No.: US 7,796,232 B2
(45) Date of Patent: Sep. 14, 2010

(54) DISPLAY PANEL AND METHOD OF MANUFACTURING THE SAME

(75) Inventors: So-Youn Park, Suwon-si (KR);
Byoung-Hun Sung, Seoul (KR);
Bong-Sung Seo, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 788 days.

(21) Appl. No.: 11/548,336

(22) Filed: Oct. 11, 2006

(65) Prior Publication Data

US 2007/0153214 A1 Jul. 5, 2007

(30) Foreign Application Priority Data

Dec. 29, 2005 (KR) ...................... 10-2005-0133140

(51) Int. Cl.
*G02F 1/1339* (2006.01)
(52) U.S. Cl. .................. 349/155; 349/156; 349/157
(58) Field of Classification Search ............. 349/156, 349/157, 155
See application file for complete search history.

(56) References Cited

U.S. PATENT DOCUMENTS

| | | | | |
|---|---|---|---|---|
| 5,831,710 A | * | 11/1998 | Colgan et al. | 349/156 |
| 6,141,078 A | * | 10/2000 | Morii et al. | 349/155 |
| 6,437,848 B1 | * | 8/2002 | Okada et al. | 349/156 |
| 6,705,584 B2 | * | 3/2004 | Hiroshima et al. | 249/155 |
| 7,375,788 B2 | * | 5/2008 | Chiang et al. | 349/155 |
| 2005/0243261 A1 | | 11/2005 | Chiang et al. | |

FOREIGN PATENT DOCUMENTS

JP  11-305241  11/1999
KR  10-2003-0015778 A  2/2003

* cited by examiner

*Primary Examiner*—Uyen-Chau N Le
*Assistant Examiner*—Chad H Smith
(74) *Attorney, Agent, or Firm*—Innovation Counsel LLP (57) ABSTRACT

A display panel includes a first substrate, a second substrate, a liquid crystal layer, a seal line and an outer spacer. The first substrate includes a display area on which a plurality of thin film transistors are formed, and a peripheral area surrounding the display area. The second substrate is opposite to the first substrate. The liquid crystal layer is disposed between the first substrate and the second substrate. The seal line is formed between the first substrate and the second substrate in the peripheral area to confine the liquid crystal between the first and second substrates. The outer spacers are disposed in the peripheral area, and inwardly spaced apart from the seal line by a separation distance thereby preventing liquid crystal from being polluted by particles of an uncured seal line during manufacturing.

12 Claims, 13 Drawing Sheets

DISPLAY PANEL AND METHOD OF MANUFACTURING THE SAME

CROSS-REFERENCE TO RELATED APPLICATIONS

This application relies for priority upon Korean Patent Application No. 2005-0133140 filed on Dec. 29, 2005, the contents of which are herein incorporated by reference in its entirety.

1. Field of the Invention

The present invention relates to a display panel and a method of manufacturing a display panel. More particularly, the present invention relates to a display panel and a method of manufacturing a display panel capable of preventing inferiority of liquid crystal.

1. Description of the Related Art

A liquid crystal display apparatus displays an image by using the optical transmittance of liquid crystal together with a backlight assembly. The display apparatus includes an array substrate on which thin film transistor switching elements are formed and a color filter substrate opposite the array substrate. The liquid crystal display panel includes a display region and a peripheral region surrounding the display region which does not display images. The liquid crystal apparatus further includes a seal line disposed between the array substrate and the color filter formed on the peripheral region for confining the liquid crystal. The liquid crystal layer may be formed, for example, by injecting the liquid crystal between the two substrates in a vacuum state by a capillary action. Alternatively, the seal line may be formed on one of the two substrates under atmospheric pressure, dropping the liquid crystal onto the other substrate and then using a vacuum to combine the two substrates. The liquid crystal dropping method requires less time than the liquid crystal injecting method and therefore the liquid crystal dropping method is more frequently used.

The liquid crystal is dropped onto the substrate as a plurality of droplets of dense liquid crystal. As the substrates are brought together, the droplets spread out over the entire area to form the liquid crystal layer. The droplets of liquid crystal dropped on the peripheral region spread out to make contact with the seal line.

However, if the liquid crystal makes contact with the seal line before the seal line is completely hardened, the liquid crystal may be polluted by the incompletely hardened seal line. In other words, particles of the seal line may flow into the liquid crystal of a display area. The pollution of the liquid crystal causes a boundary spot and degrades display quality.

SUMMARY OF THE INVENTION

The present invention provides a display panel capable of preventing liquid crystal from migrating outwardly toward the seal line by including spacers in the peripheral area at least one of which is inwardly spaced apart from the seal line by a separation distance. A printing plate is prepared that has inner receiving recesses in the display area and outer receiving recesses in the peripheral area. The inner receiving recesses are filled with inner spacers, and the outer receiving recesses are filled with outer spacers. The inner spacers and the outer spacers are attached to a surface of a printing roller when the printing roller is rotated on the printing plate. Then, the inner spacers and the outer spacers are arranged on the first substrate when the printing roller is rotated on the first substrate. According to the above, the outer spacers are arranged in the peripheral area to prevent liquid crystal from moving outwardly and to prevent the liquid crystal from being polluted by the seal line.

BRIEF DESCRIPTION OF THE DRAWING

The above and other advantages of the present invention will become readily apparent by reference to the following detailed description when considered in conjunction with the accompanying drawings wherein.

DESCRIPTION OF THE EMBODIMENTS

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
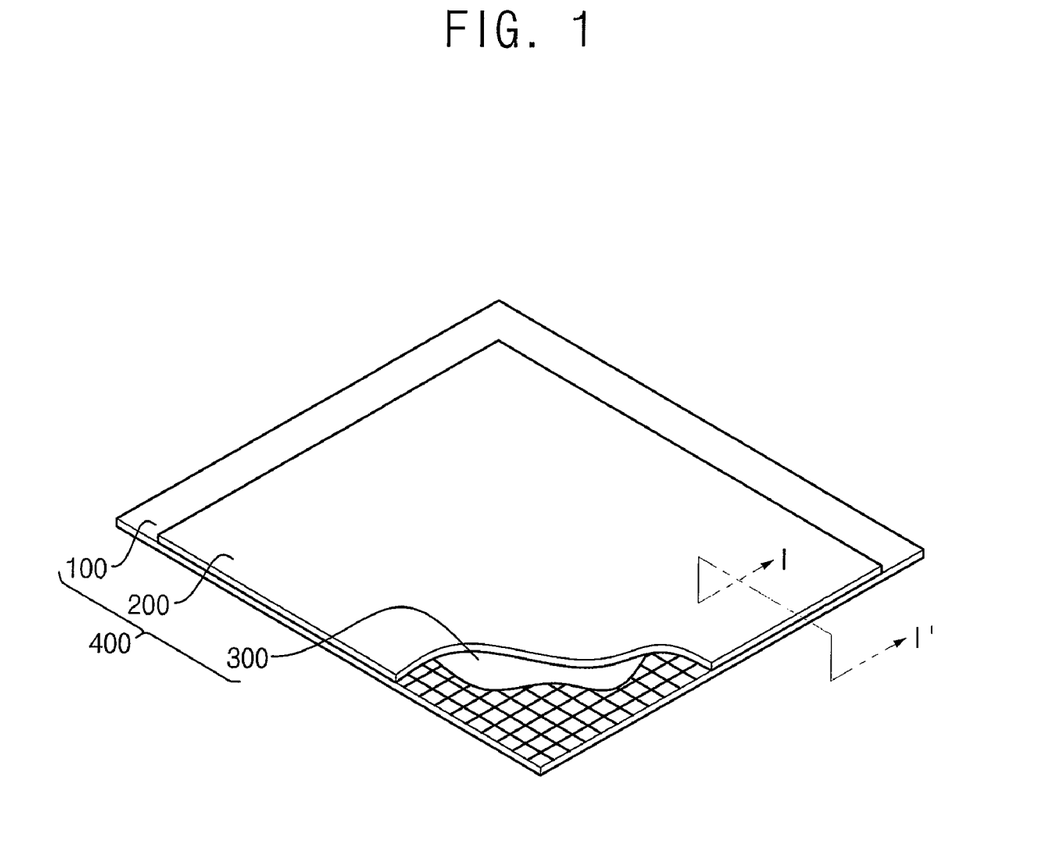
FIG. 1 is a perspective view showing a partially cutout display panel according to an example embodiment of the present invention.

Hereinafter, the present invention will be explained in detail with reference to the accompanying drawings. FIG. 1 is a perspective view showing a partially cutout display panel according to an example embodiment of the present invention.

Referring to FIG. 1, the display panel 400 according to the present embodiment includes a first substrate 100, a second substrate 200 and a liquid crystal layer 300 for display images. First substrate 100 includes a plurality of pixel electrodes arranged in a matrix shape, a plurality of thin film transistors to apply a drive voltage to each of the pixel electrodes, and a plurality of signal lines to operate each of the thin film transistors.

A second substrate 200 faces first substrate 100. Second substrate 200 includes a common electrode and color filters.

The common electrode is formed on a front surface of first substrate 100 and includes a transparent and conductive material. The color filters are disposed opposite to the pixel electrode.

The color filters include a red color filter selectively transmitting red components, a green color filter transmitting green components and a blue color filter transmitting blue components.

A liquid crystal layer 300 is disposed between the first and second substrates 100 and 200. Liquid crystal molecules of liquid crystal layer 300 are rearranged by an electric field generated between the pixel electrodes and the common electrode. The rearranged liquid crystal molecules of liquid crystal layer 300 control the transmittance of externally provided light which passes through the color filters to display an image.

Figure 2:
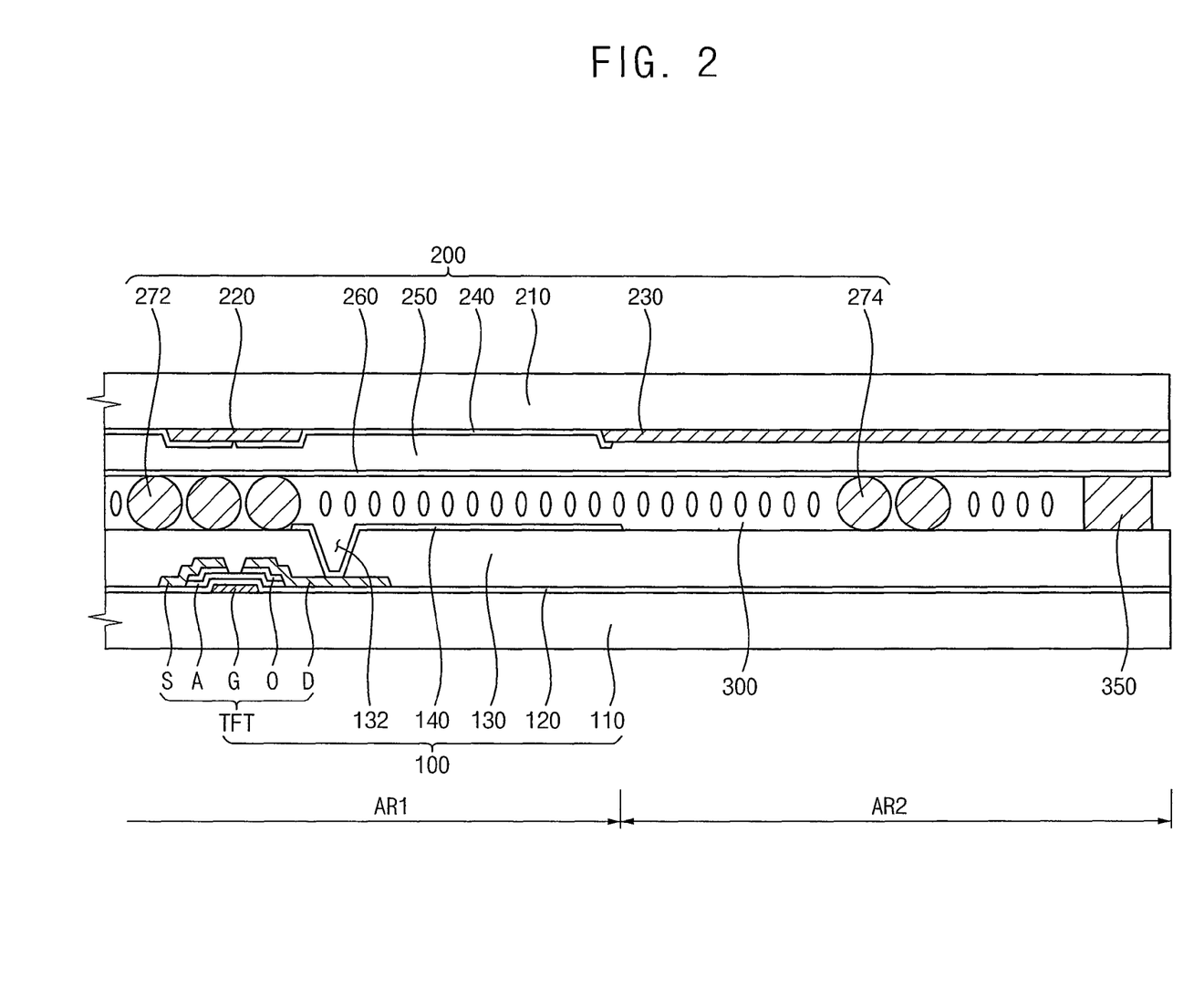
FIG. 2 is a cross-sectional view taken along a line I-I' of FIG. 1.
Figure 3:
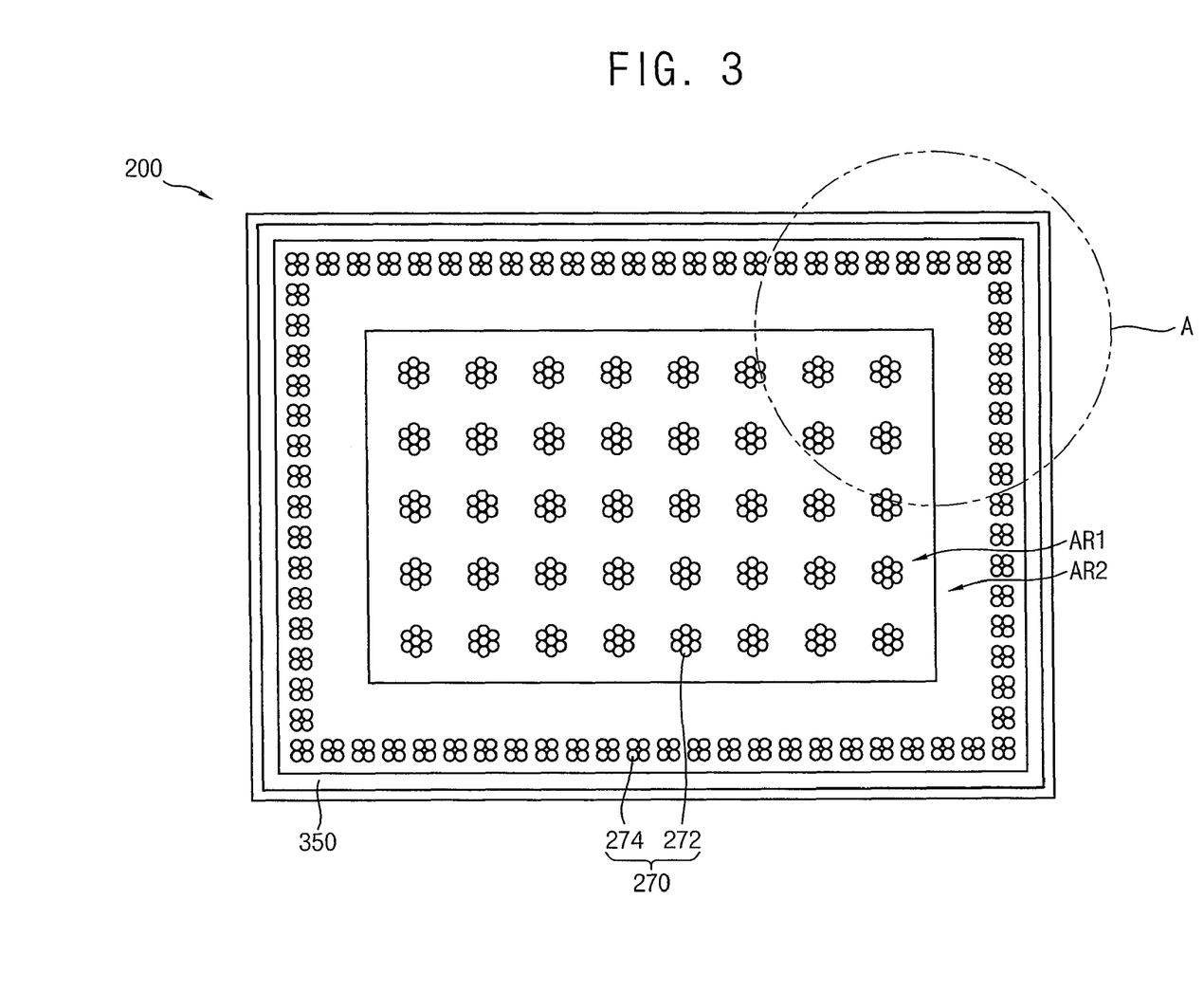
FIG. 3 is a plan view showing a second substrate of the display panel.
Figure 4:
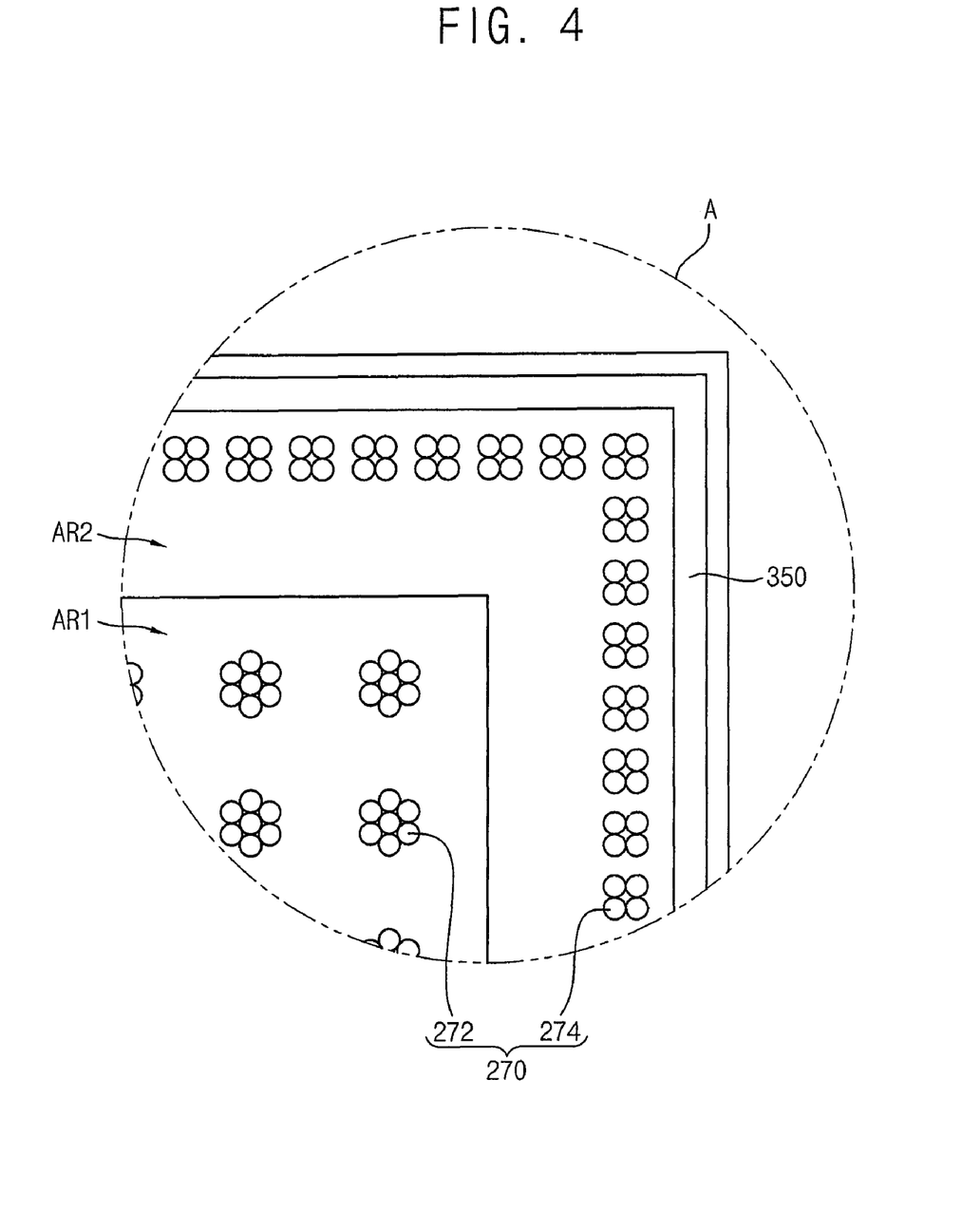
FIG. 4 is an enlarged view showing portion A of FIG. 3.

FIG. 2 is a cross-sectional view taken along a line I-I' in FIG. 1. FIG. 3 is a plan view showing a second substrate of the display panel in FIG. 1, and FIG. 4 is an enlarged view showing a portion A in FIG. 3.

Referring to FIGS. 2 and 3, display panel 400 includes first substrate 100, second substrate 200, liquid crystal layer 300 and seal line 350. First substrate 100 includes a first transparent substrate 110, a gate line, a data line, a storage line, a gate insulation layer 120, a thin film transistor, a protection layer 130 and a pixel electrode 140. First substrate 100 may include a display area AR1 displaying images, and a peripheral area AR2 surrounding the display area AR1.

First transparent substrate 110 has a plate shape and includes transparent resins, such as glass, quartz, sapphire or polyester, polyacrylate, poly carbonate, poly ether ketone, etc. A plurality of the gate lines is formed on the first transparent substrate 110 in a first direction and a plurality of the data lines is formed in a second direction intersecting the first direction that, preferably, is perpendicular to the second direction. A plurality of the storage lines is formed in parallel with the gate lines.

Gate insulation layer 120 is formed on first transparent layer 110, covering the gate lines and the storage lines. Gate insulation layer 120 includes a transparent insulation material such as silicon oxide and silicon nitride. The gate lines are formed under the gate insulation layer 120 and the data lines are formed on the gate insulation layer 120, so that the gate lines and the data lines are electrically insulated from each other.

The gate lines and the data lines are perpendicular to each other and a plurality of unit pixels is defined on the display area AR1 of first substrate 100. The thin film transistor and the pixel electrode are formed on each of the unit pixels. The thin film transistor includes a gate electrode G, a source electrode S, an active layer A and an ohmic contact layer O.

For example, gate electrode G extends in a second direction from the gate line and is formed on first transparent substrate 110. Source electrode S extends in the first direction from the data line and is formed to overlap a portion of gate electrode G. Drain electrode D is spaced apart from the source electrode S and overlaps a portion of gate electrode G. Drain electrode D is electrically connected to the pixel electrode 140 through a contact hole 132. Active layer A is disposed between the gate electrode G and the source and drain electrodes S and D to cover the gate electrode G. Ohmic contact layer O is disposed between the active layer A, and the source and drain electrodes S and D.

Protection layer 130 is formed on the front surface of the first substrate to cover the thin film transistor, and protects the thin film transistor against external heat and humidity. Protection layer 130 includes a contact hole 132 exposing an upper portion of drain electrode D.

Pixel electrode 140 is formed of a transparent conductive material on each unit pixel. Pixel electrode 140 is electrically connected to drain electrode D of the thin film transistor through contact hole 132 and is electrically charged by a driving voltage applied thereto from the thin film transistor. The driving voltage is maintained for a determined time by the storage line. Pixel electrode 140, for example, is formed through a photolithographic and etching process on indium tin oxide film (ITO), indium zinc oxide film (IZO), amorphous Indium tin oxide film (a-ITO), etc.

Second substrate 200 is disposed opposite to first substrate 100. The second substrate defines a display area AR1 and a peripheral area AR2 in the same manner as in first substrate 100.

Second substrate 200 includes a second transparent substrate 210, a light-shielding layer, a color filter 240, a planarizing layer 250, a common electrode 260 and a plurality of spacers 270, 272, 274. The light-shielding layer includes an inner light shielding layer 220 and an outer light-shielding layer 230. Second transparent substrate 210 has a plate shape and is made of a transparent material that, for example, includes the same material as that of the first substrate 110.

The inner light-shielding layer 220 is formed, for example, from an opaque inorganic material such as chrome (Cr) in a portion of display area AR1 and shields light so that gate line, data line, storage line and thin film transistor of first substrate 100 are not seen from the outside. Outer light-shielding layer 230 is formed on the peripheral area AR2 and forms a closed loop along the peripheral area AR2 having a width that ranges from about 2 mm to about 3 mm.

Color filter 240 is formed on display area AR1 of second transparent layer 210, covering inner light-shielding layer 220. The color filters may include a red color filter, a green color filter, a blue color filter, etc.

The planarizing layer 250 is formed on the whole surface of second transparent substrate 210 to cover color filter 240 and outer light-shielding layer 230. Planarizing layer 250 planarizes the surface on which color filter 240 and outer light-shielding layer 230 are formed. Planarizing layer 250, may be made of a transparent organic material.

Common electrode 260 is formed on the planarizing layer 250. The common electrode 260 includes a transparent conductive material, such as indium tin oxide film (ITO), indium zinc oxide film (IZO) and amorphous indium tin oxide film (a-ITO). When a data voltage is applied to pixel electrode 140 of first substrate 100, an electric field is generated between the common electrode 260 and the pixel electrode 140.

Spacers 270 are disposed between the first and second substrates 100 and 200 to maintain the cell gap there between. Spacers 270 include inner spacers 272 correspondingly formed to the inner light-shielding layer 220, and outer spacers 274 correspondingly formed to the outer light-shielding layer 230.

Liquid crystal layer 300 is disposed between the first and second substrates 100 and 200, and includes liquid crystal molecules that are arranged by the electric field generated between the common electrode 260 and the pixel electrode 140. The liquid crystal molecules of liquid crystal layer 300 are rearranged by the electric field generated between the pixel electrode 140 of the first electrode 100 and the common electrode 260 of second substrate 200.

A seal line 350 is disposed between the first and second substrates 100 and 200, and forms a closed loop along the peripheral area AR2. Seal line 350 is spaced apart outwardly from outer spacers 274 by a separation distance, for example, of about from 8 μm to about 10 μm. For example, a width of seal line 350 ranges from about 1 mm to about 1.6 mm preferably.

Seal line 350, for example, includes a sealant to combine first substrate 100 and second substrate 200. Seal line 350 is formed on the outermost peripheral portion of the peripheral area A2, and confines the liquid crystal material between first substrate 100 and second substrate 200 to prevent leakage of the liquid crystal.

Referring to FIGS. 2, 3 and 4, spacers 270 include inner spacers 272 and outer spacers 274. For example, each spacer 270 has a spherical shape having a diameter that ranges from about 3 μm to about 5 μm for example, about 4 μm. Each spacer may be made of an elastic polymer organic material such as divinyl benzene.

Inner spacers 272 are correspondingly disposed between first substrate 100 and second substrate 200. A number inner spacers 272 may be grouped to form a plurality of unit blocks. The unit blocks of each group are correspondingly disposed in display area A1 in a matrix shape. For example, the inner spacers may be arranged in groups of seven or eight.

Inner spacers 272 are disposed between the first and second substrates 100 and 200 to elastically maintain a gap between the substrates.

Outer spacers 274 are correspondingly disposed between the first and second substrates 100 and 200 adjacent to outer light-shielding layer 230. Outer spacers 274 are arranged along a closed loop in the peripheral area AR2 that surrounds display area AR1. As a result, the liquid crystal disposed between the first and second substrates 100 and 200 is blocked from flowing outwardly.

Outer spacers 274 are arranged along the closed loop, in contact with or spaced apart from each other by a separation distance. When outer spacers 274 are arranged along the closed loop such that outer spacers 274 make contacts with each other, the liquid crystal is blocked from flowing outwardly more efficiently than a case when outer spacers 274 are arranged along the closed loop such that outer spacers 274 are spaced apart from each other by a separation distance.

A desired number of outer spacers 274 are grouped together to form a plurality of unit blocks. The unit blocks of outer spacers 274 are disposed in the peripheral area AR2 along the closed loop. Preferably, each of the unit block includes four outer spacers.

The unit blocks may be disposed along the closed loop such that the unit blocks make contacts with each other or are spaced apart from each other by a separation distance. When the unit blocks are arranged along the closed loop such that unit blocks makes contacts with each other, the liquid crystal is blocked from flowing outwardly more efficiently than when the unit blocks are arranged along the closed loop such that the unit blocks are spaced apart by a separation distance. As shown in the figure, the unit blocks are arranged along the closed loop such that the unit blocks are spaced apart by a separation distance.

According to the example embodiment, outer spacers 274 are disposed in peripheral area AR2 along the closed loop, thus delaying the outward flowing of the liquid crystal disposed between first substrate 100 and second substrate 200 to prevent the liquid crystal from being polluted by a partially hardened seal line 350. Furthermore, particles of the partially hardened seal line 350 are blocked by outer spacers 274 so that the particles are prevented from flowing into display area AR1.

Display panel 400 according to the example embodiment includes second substrate 200 having a light-shielding layer and a color filter. Alternatively, display panel 400 may have a color filter on array (COA) structure in which first substrate 100 includes the light-shielding layer and the color filter. Furthermore, the present invention may be applied to various display panels having other structures.

Figure 5:
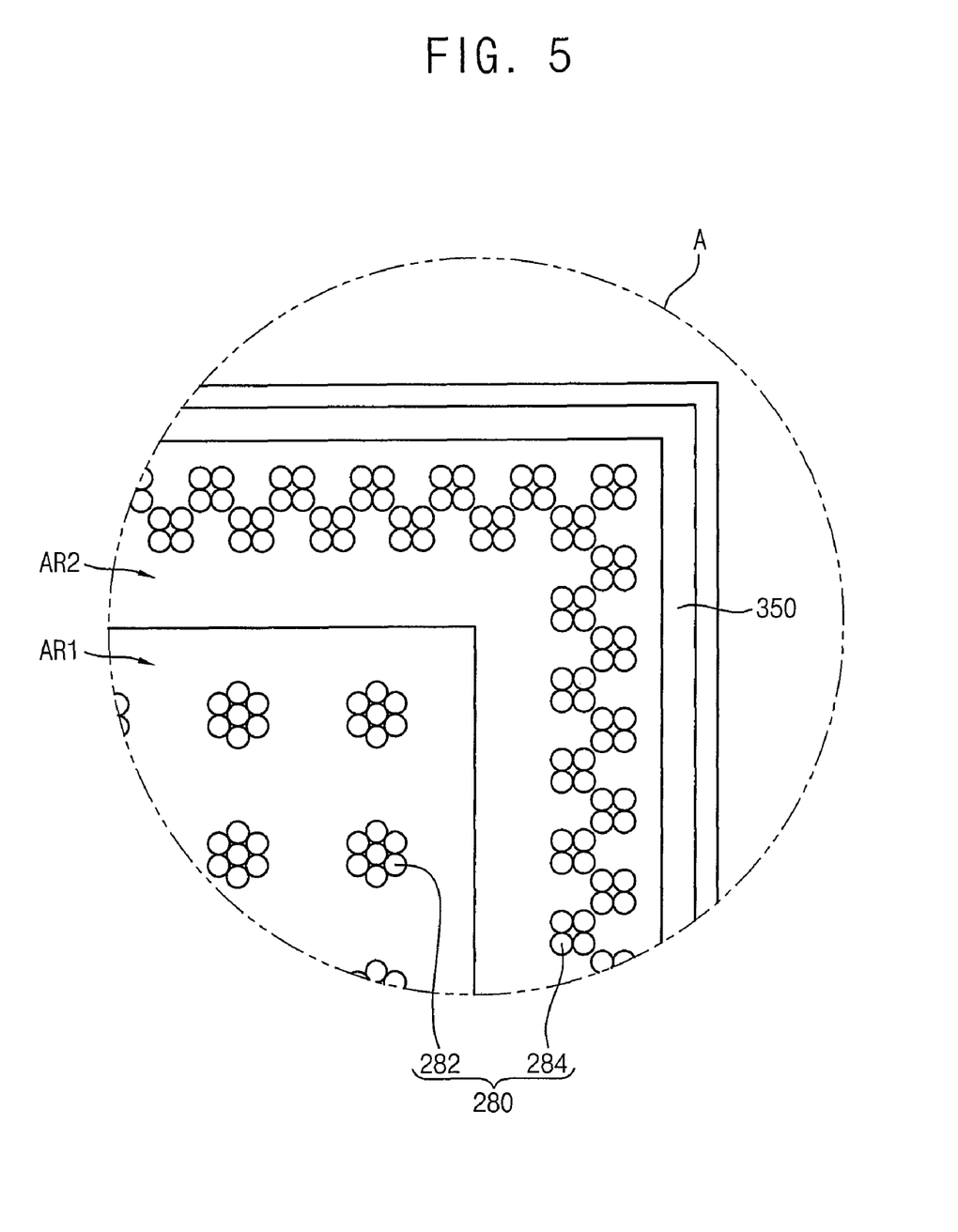
FIG. 5 is an enlarged view showing portion A according to an alternative embodiment.

FIG. 5 is an enlarged view showing a portion A in FIG. 3 according to another example embodiment. The display panel according to the present embodiment of the invention is same as the above-mentioned embodiment, except for the spacers. Thus, the same reference numerals will be used to refer to the same or like parts as those described in first embodiment and any further explanation will be omitted.

Referring to FIG. 5, spacers 280 according to the present example embodiment include inner spacers 282 and outer spacers 284. Each of the spacers 280 has, for example, a spherical shape. A diameter of each of the spacer 280 ranges from about 3 μm to about 5 μm, preferably, for example, about 4 μm. Each of the spacer is of an elastic polymer organic material such as divinyl Benzene.

Inner spacers 282 are disposed between the first and second substrates 100 and 200, such that inner spacers 282 correspond to the inner light-shielding layer 220. A plurality of inner spacers 282 is grouped by a desired number to form a plurality of unit blocks. The unit blocks of each group are disposed in the display area A1 in a matrix shape. For example, inner spacers 282 are arranged in groups of seven or eight.

The elasticity of inner spacers 282 disposed between the first and second substrates 100 and 200 maintains a cell gap between the first and second substrates 100 and 200 adjacent the outer light-shielding layer 230. Outer spacers 284 are arranged along a plurality of the closed loops in peripheral area AR2.

Spacers 280, disposed along the outermost peripheral closed loop, are spaced apart from seal line 350 by a separation distance, which ranges from about 8 μm to about 10 μm. Also, the number of the closed loops for outer spacers 284 may be varied according to the expected leakage of the liquid crystal. When the number of the closed loops increases, flowing of the liquid crystal is increasingly delayed. On the contrary, when the number of the closed loops decreases, flowing of the liquid crystal is less delayed.

Outer spacers 284 are grouped by a desired number to form a plurality of unit blocks. The unit blocks of outer spacers 284 are disposed in the peripheral area AR2 along a plurality of the closed loops. The unit block of the closed loop is disposed between the unit blocks of the adjacent closed loop.

For example, the unit blocks of outer spacers 284 are disposed to form an inner closed loop and an outer closed loop. For example, each of the unit block of outer spacers 284 includes four outer spacers 284. Each of the unit blocks of the inner closed loop is disposed between the unit blocks of the outer closed loop.

As outer spacers 284 are disposed in the peripheral area AR2 along the plurality of the closed loops, flowing of the liquid crystal disposed between first substrate 100 and second substrate 200 is more delayed.

FIGS. 6 to 13 are views illustrating a method of making a display panel according to an example embodiment. Hereinafter, the method for making the display panel will be explained in detail with reference to the accompanying drawings.

Figure 6:
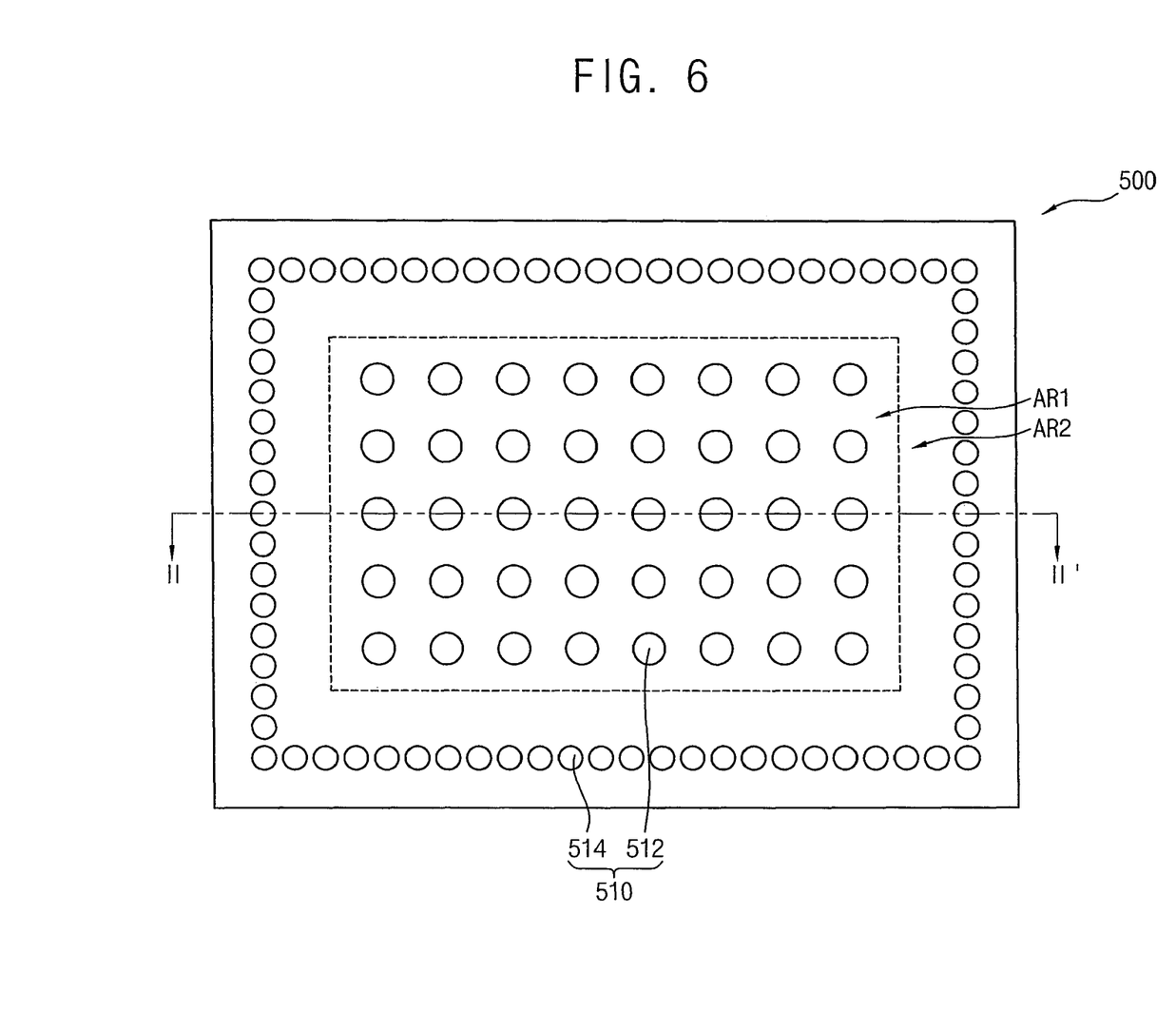
FIGS. 6 to 13 are views illustrating a method of making a display panel according to still another example embodiment.
Figure 7:
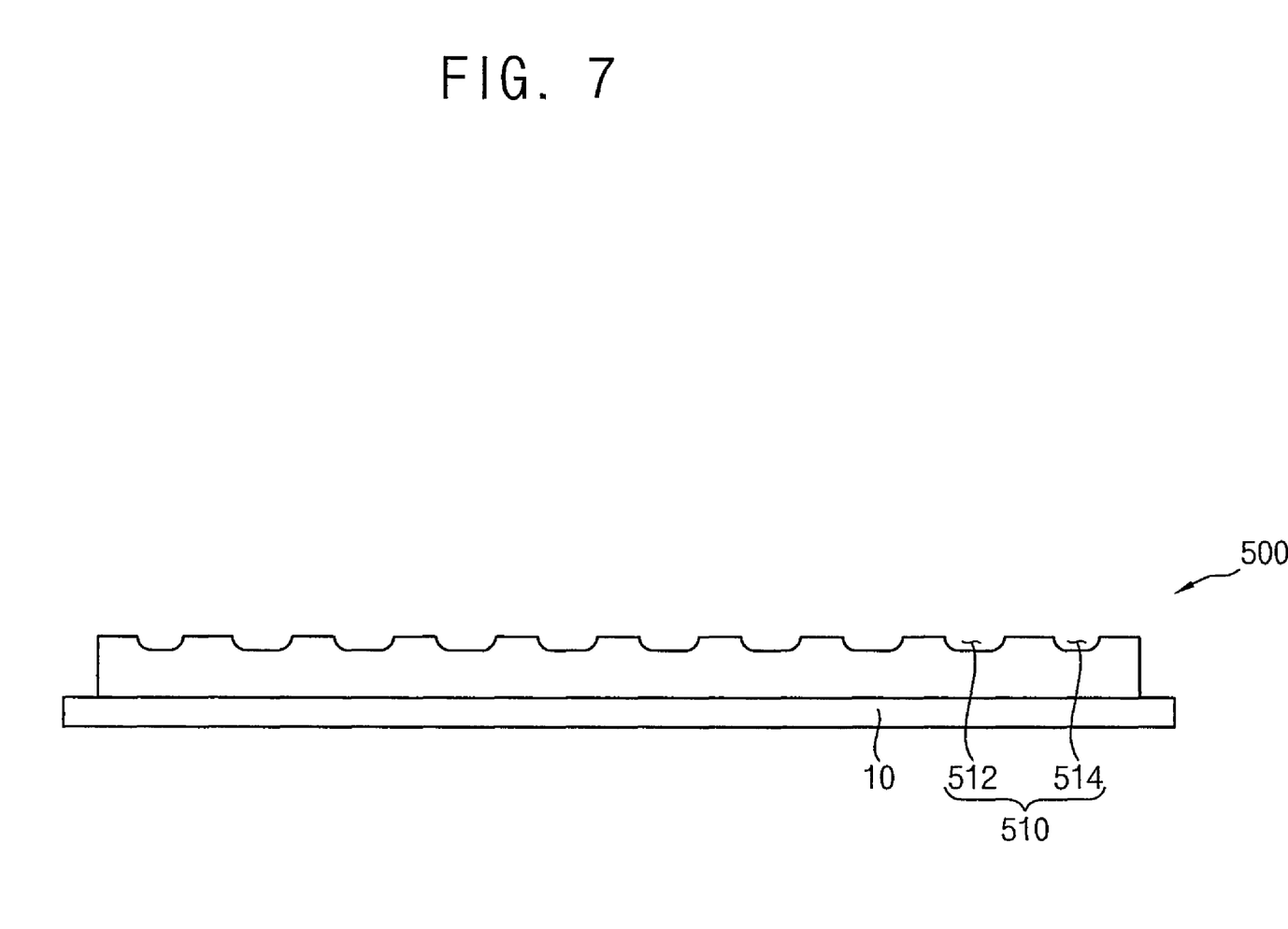

FIG. 6 is a plan view illustrating a printing plate used for manufacturing the display panel according to an example embodiment and FIG. 7 is a cross-sectional view taken along II-II' shown in FIG. 6.

Referring to FIGS. 6 and 7, a printing plate 500 including receiving recesses 510 is arranged on a stage 10. In detail, the receiving recesses 510 include inner recesses 512 and outer recesses 514. Printing plate 500 includes a display area AR1 and a peripheral area AR2 surrounding the display area AR1.

Inner recesses 512 are formed on the display area AR1 in a matrix shape. The outer recesses 514 are formed on the peripheral area AR2 along at least one closed loop.

Figure 8:
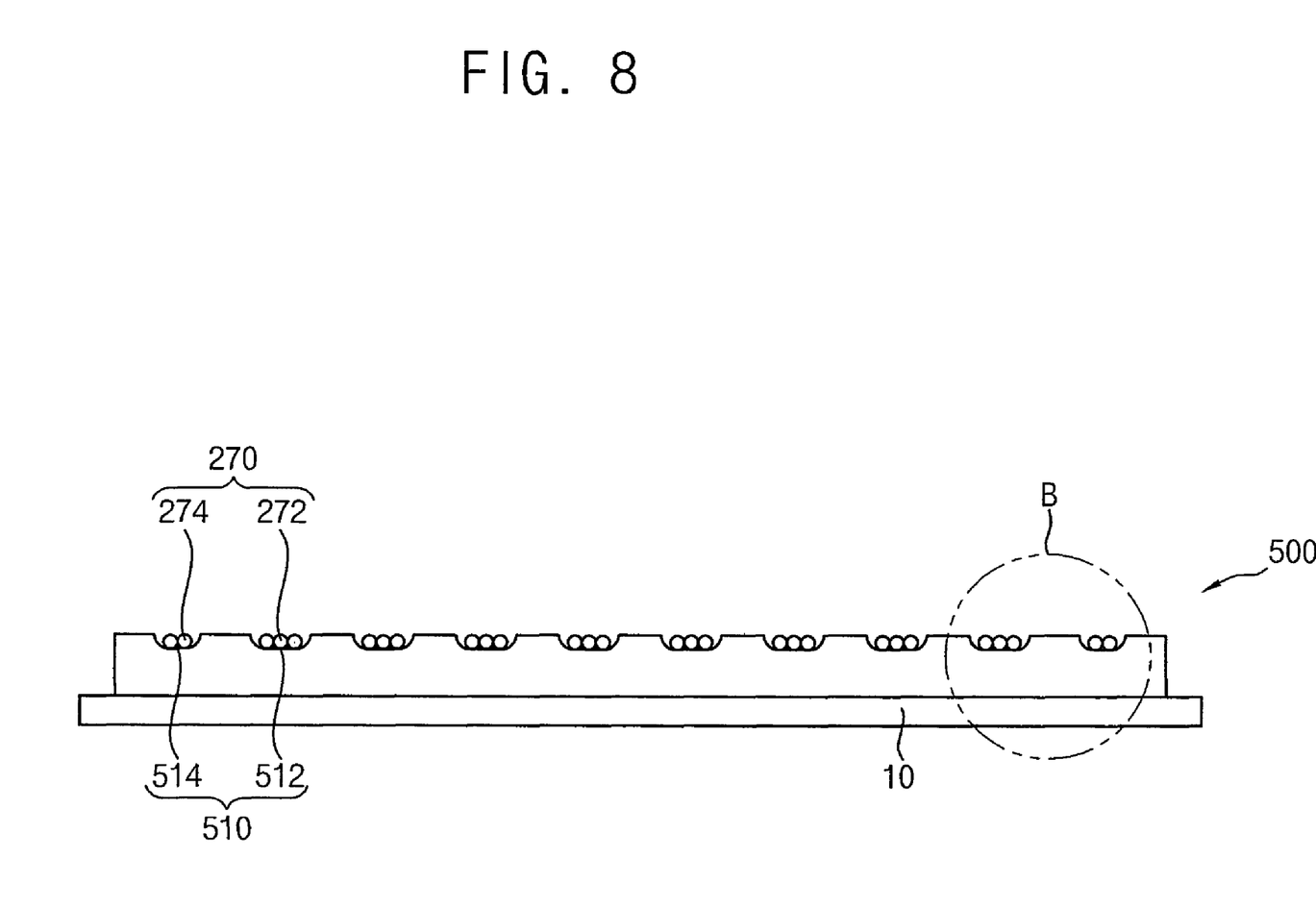
Figure 9:
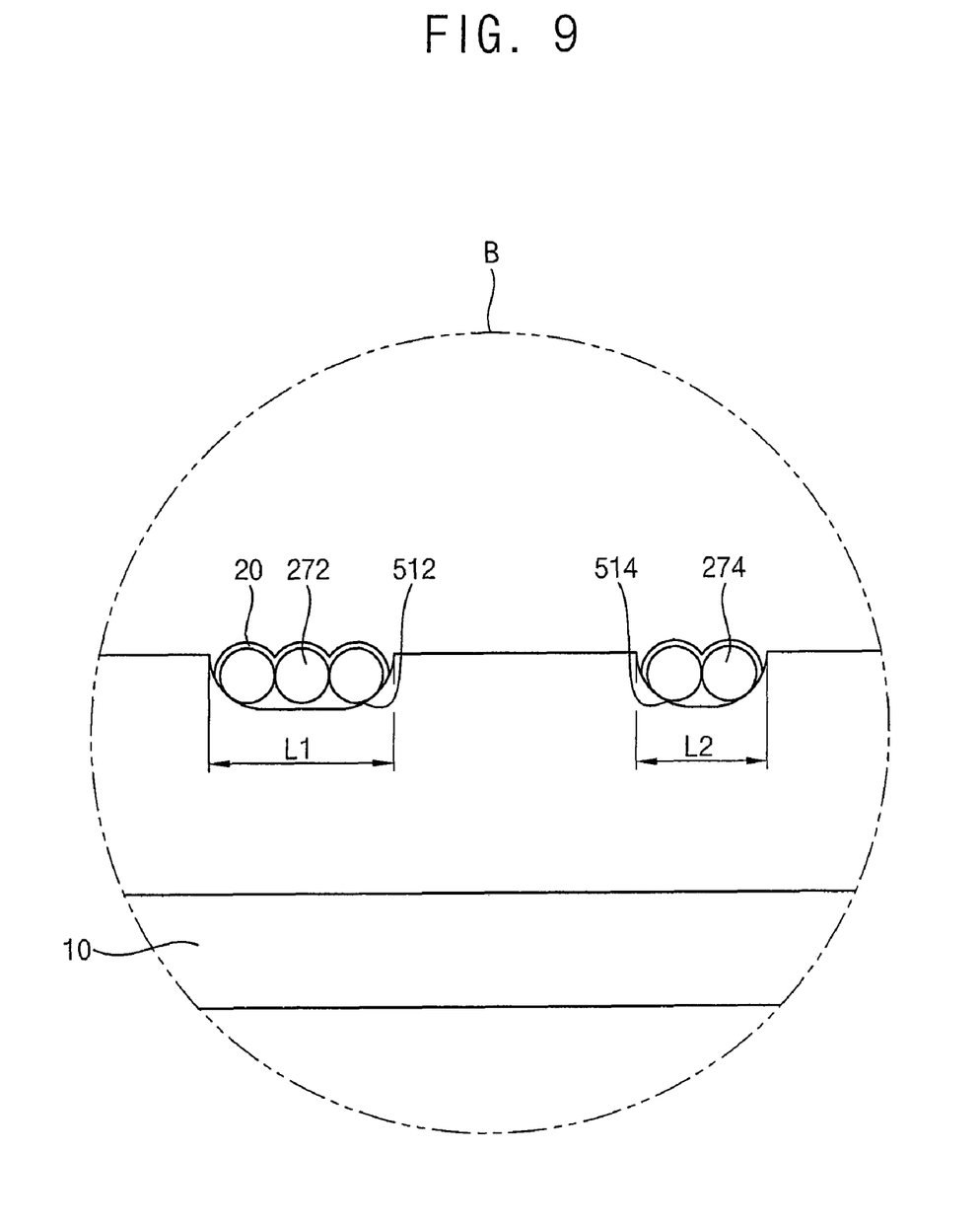

FIG. 8 is a cross-sectional view illustrating an arrangement of spacers on a printing plate shown in FIG. 6, and FIG. 9 is an enlarged cross-sectional view of a portion B in FIG. 8.

Referring to FIGS. 8 and 9, the inner receiving recesses 512 and the outer recesses 514 are filled with spacers 270. For example, each of the inner receiving recess 512 is filled with the seven or eight spacers 270 and each of the outer spacer 514 is filled with the four spacers 270. The spacers received in the inner receiving recess 512 are defined as inner spacers 272 and the spacers received in the outer receiving recess 514 are defined as outer spacers 274.

For example, a depth of the inner receiving recess 512 is the same as a diameter of the spacer 270, and a width L1 of the inner receiving recess 512 ranges from about 21 μm to about 25 μm to receive the seven or eight spacers. A depth of the outer receiving recess 514 is the same as a diameter of the spacer 270, and a width L2 of the outer receiving recess 514 ranges from about 16 μm to about 19 μm to receive the four spacers.

Also, when the inner receiving recesses 512 and the outer recesses 514 are filled with spacers 270, preferably a little of ink 20 is filled together. Spacers 270 received in the inner receiving recesses 512 and the outer receiving recesses 514 are covered with the ink 20. The ink 20 is a viscous and thermosetting material. For example, the ink 20 is white and includes resins such as melamine and polyester.

Figure 10:
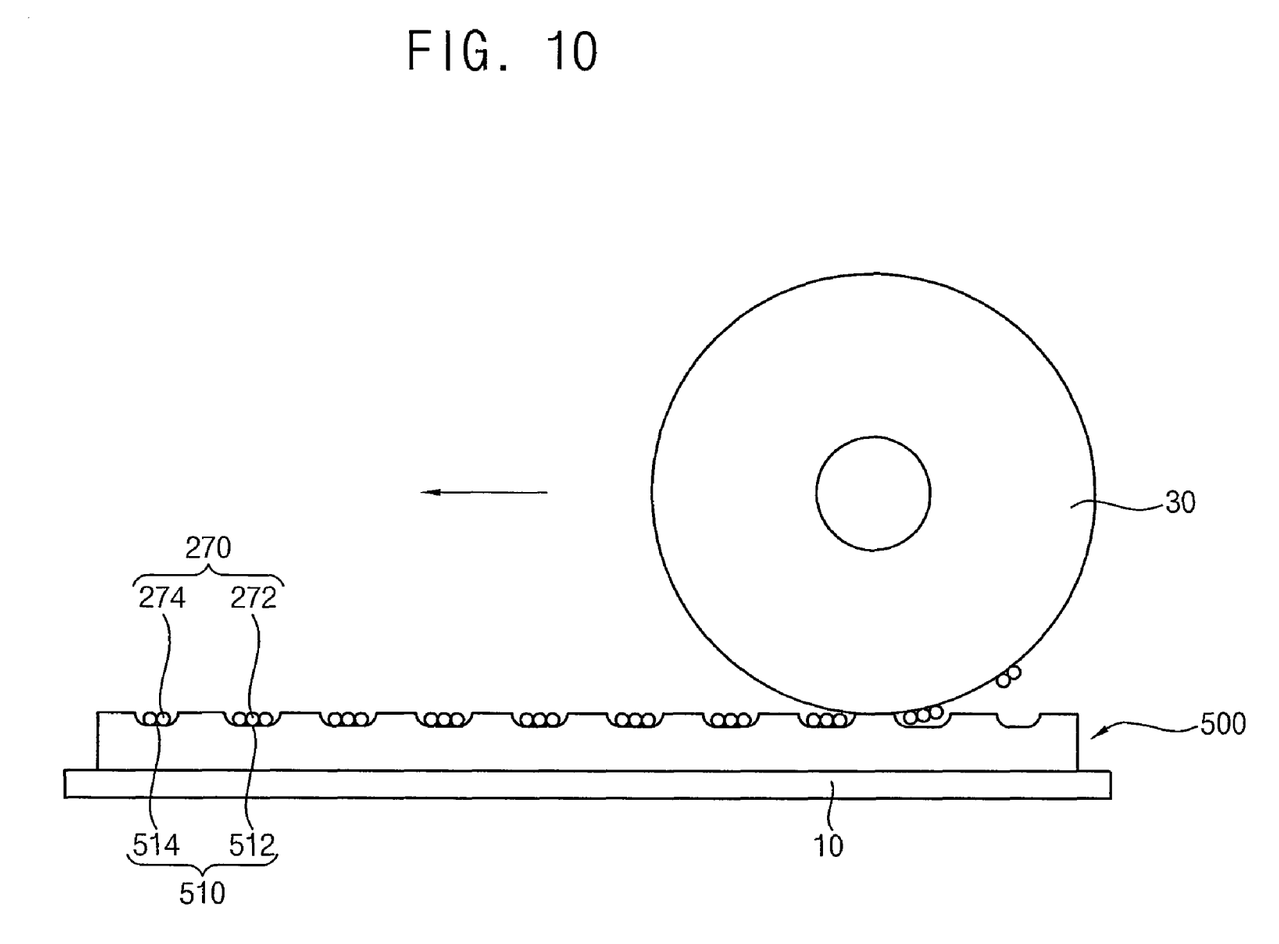

Referring to FIG. 10 spacers 270 are attached to the surface of a printing roller when the printing roller 30 rolls on printing plate 500. In other words, when the printing roller 30 is rotated such that the printing roller 30 makes contact with the surface of printing plate 500, the spacers in the receiving recesses 510 are attached to the surface of the printing roller 30. Due to viscosity of the ink that covers spacers 270, spacers 270 are easily attached to the surface of the printing roller 30.

Figure 11:
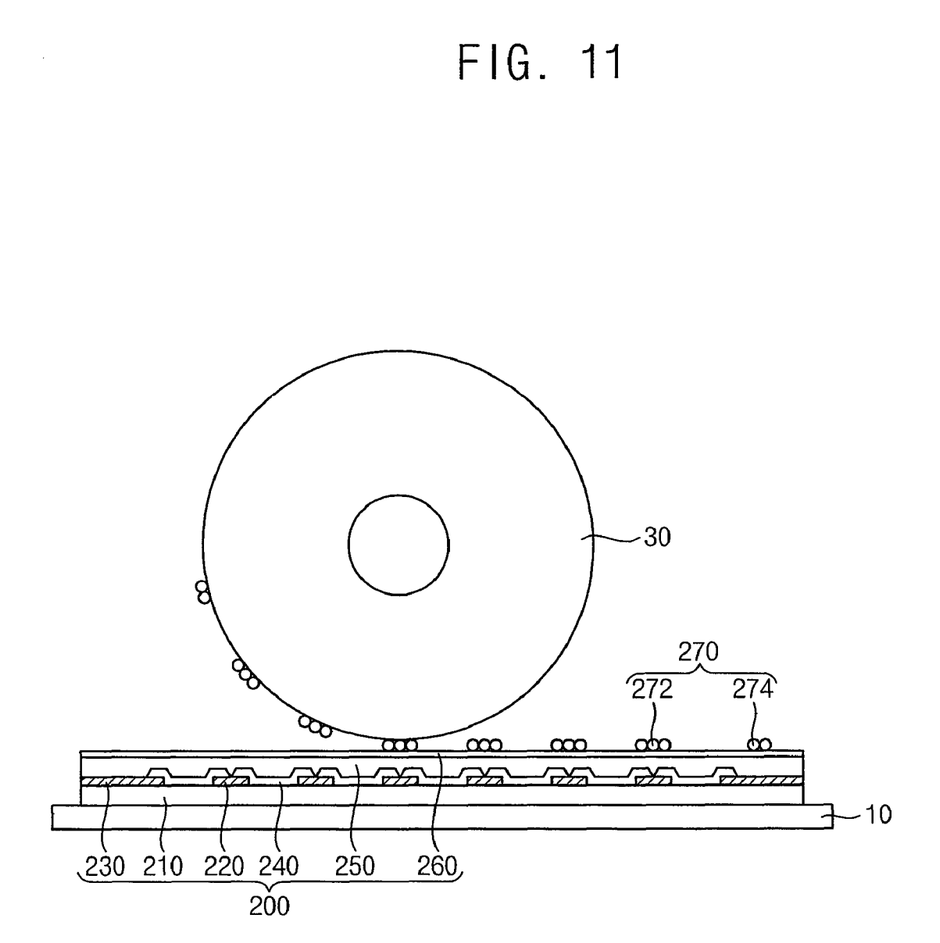

FIG. 11 is a cross-sectional view illustrating the deposition of the spacers attached on a printing roller to a second substrate.

Referring to FIG. 11, spacers 270 attached to the surface of the printing roller 30 are deposited on second substrate 200 by rotation of the printing roller 30. In other words, when the printing roller 30 is rotated such that the printing roller 30 makes contact with a surface of second substrate 200, spacers attached to the surface of the printing roller 30 are attached to the surface of second substrate 200. Due to viscosity of the ink that covers spacers 270, spacers 270 are easily attached to the surface of second substrate 200.

According to the example embodiment, spacers 270 are attached to the surface of second substrate 200 by the printing roller 30. On the other hand, spacers 270 may be attached on the surface of first substrate 100, which thin film transistor is formed on, by the printing roller 30.

When spacers 270 are arranged on second substrate 200, inner spacers 272 received in the inner receiving recess 512 are arranged over an inner light-shielding layer 220 and outer spacers 274 received in the outer receiving recess 514 are arranged over an outer light-shielding layer 230.

Figure 12:
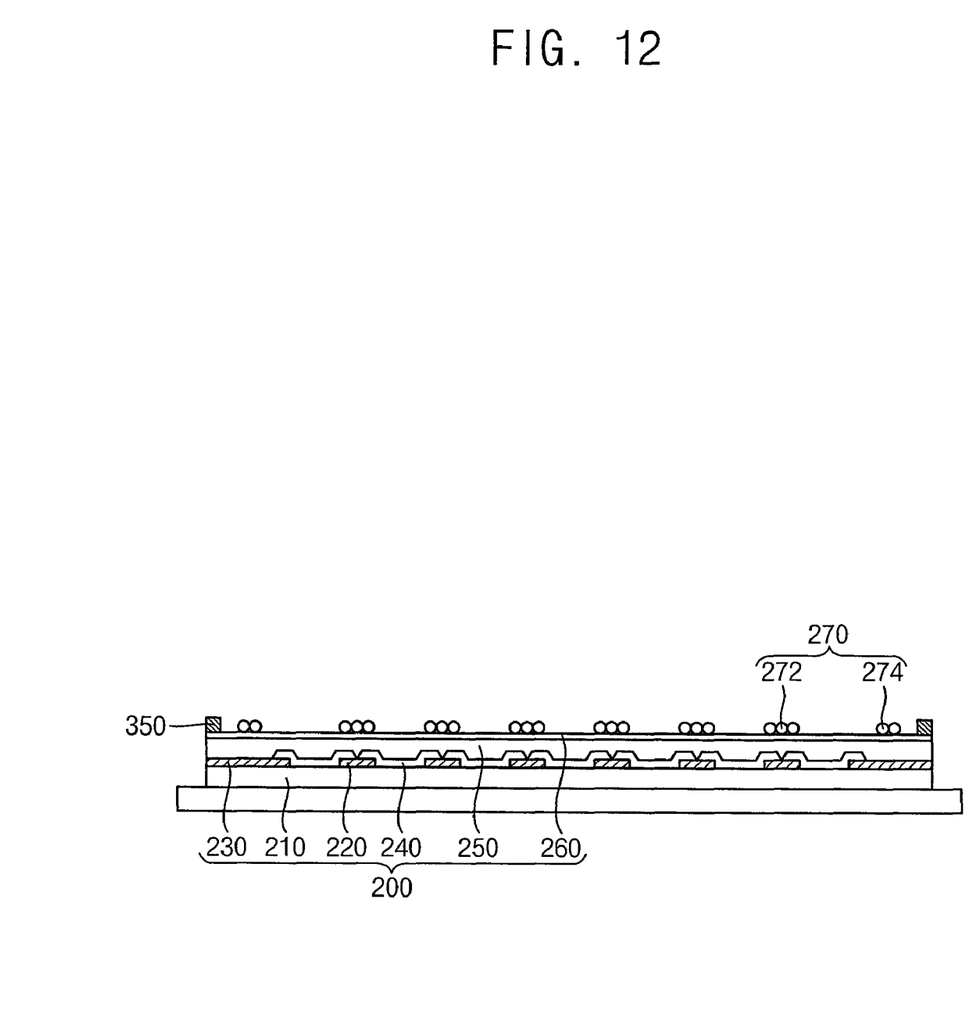

FIG. 12 is a cross-sectional view illustrating forming a seal line on a second substrate.

Referring to FIG. 12, a seal line 350 is formed on a second substrate 200. The seal line is formed corresponding to the peripheral area AR2 to form a closed loop. Seal line 350 is spaced apart outwardly from outer spacers 274 by a separation distance, for example, of about from 8 μm to about 10 μm. Seal line 350 includes a sealant and the sealant is thermosetting.

Although not shown in the figure, a plurality of droplets of liquid crystal is dropped onto first substrate 100 including the first transparent substrate 110, the gate insulation layer 120, the thin film transistor (TFT), the protection layer 130 and the pixel electrode 140. The liquid crystal is massed on first substrate 100 due to surface tension. Alternatively, seal line 350 may be formed on first substrate 100 and the droplets may be dropped onto second substrate 200.

Figure 13:
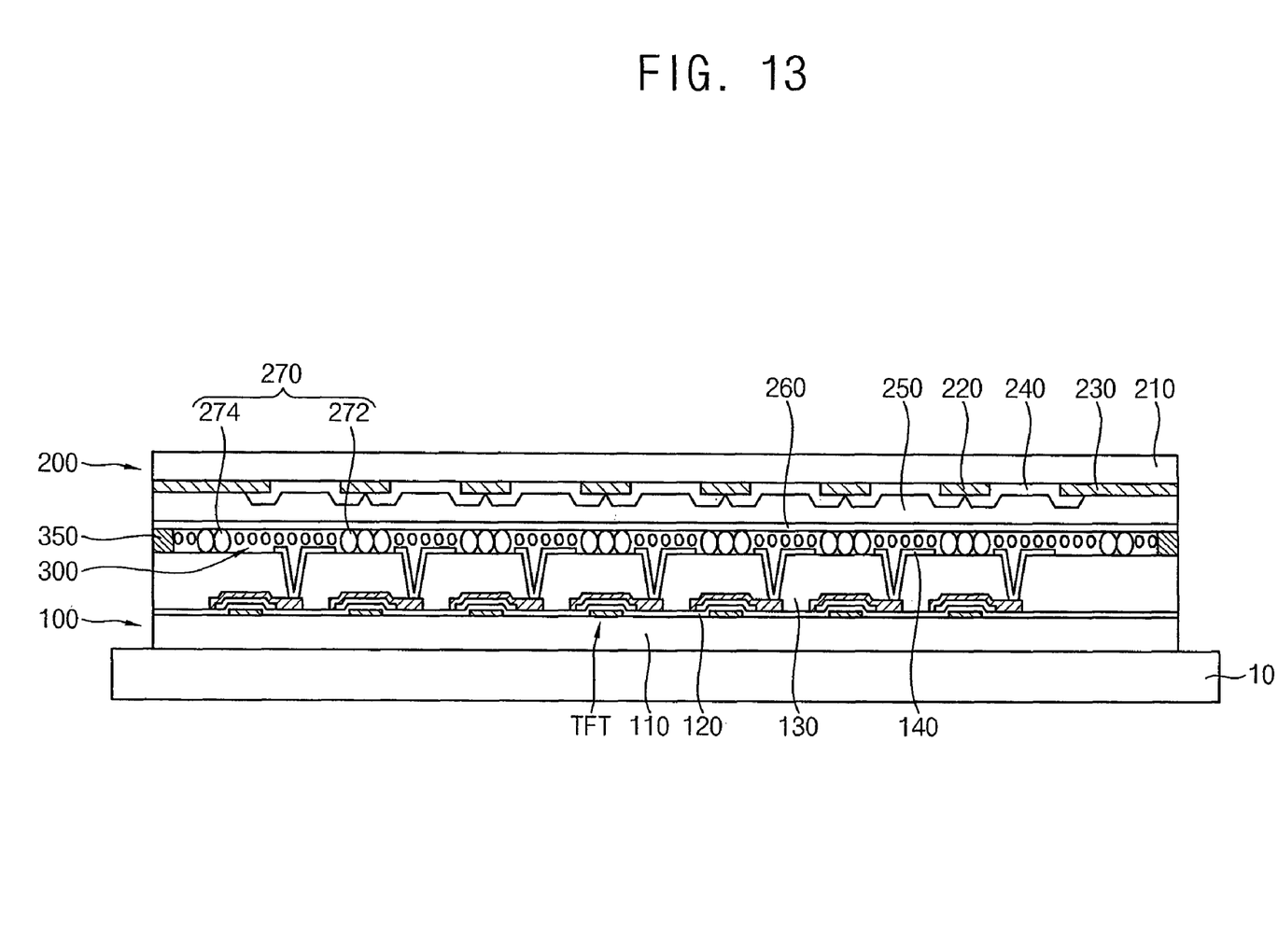

FIG. 13 is a cross-sectional view illustrating manufacturing a display panel by combining a first substrate and a second substrate.

Referring to FIG. 13, a first substrate 100 and a second substrate 200 are combined and the droplets of the liquid crystal dropped onto second substrate 200 move between first substrate 100 and second substrate 200 to form a liquid crystal layer 300. Seal line 350 combines the first and second substrates 100 and 200, and confines a liquid crystal material between the first and second substrates 100 and 200 for preventing leakage of the liquid crystal.

When the combined first and second substrate is heated, seal line 350 is hardened, and the ink formed on the surface of spacers 270 may be hardened together, so that spacers 270 are fixed thereto.

Spacers 270 are transferred by the ink in the sequence of printing plate 500, the printing roller 300 to second substrate 200. For example, the ink adheres stronger to the printing roller 300 than to printing plate 500, and the ink adheres stronger to second substrate 200 than to the printing roller 300.

When seal line 350 makes contact with the liquid crystal before seal line 350 is hardened, the liquid crystal may be polluted. However, according to the present invention, as outer spacers 274 are disposed along the peripheral area AR2, the dropped liquid crystal between the first and second substrates 100 and 200 is blocked from moving outwardly. Therefore, the liquid crystal is not polluted by contact with seal line 350 during hardening. Furthermore, minute particles of seal line 350 may not invade the display area.

According to the present invention, as outer spacers are disposed along the peripheral area, the liquid crystal between the first and second substrates is prevented from moving outwardly and contacting with the partially hardened seal line to improve display quality.

Although the example embodiments of the present invention have been described, it is understood that the present invention should not be limited to these example embodiments but various changes and modifications can be made by those of ordinary skill in the art without, however, departing from the spirit and scope of the invention.

What is claimed is:

1. A display panel comprising:
   a first substrate including a display area in which a plurality of thin film transistors are formed, and a peripheral area surrounding the display area;
   a second substrate opposite to the first substrate;
   a liquid crystal layer disposed between the first and second substrates;
   a seal line formed between the first and second substrates along the peripheral area, the seal line confining the liquid crystal layer between the first and second substrates; and outer spacers formed in the peripheral area, the outer spacers being inwardly spaced apart from the seal line by a separation distance, wherein the outer spacers are arranged along a closed loop in the peripheral area surrounding the display area and make contact with each other, wherein an outer spacer has a spherical shape.

2. The display panel of claim 1, wherein the outer spacers are grouped by a desired number to form a plurality of unit blocks, and the unit blocks are arranged along the closed loop in peripheral area.

3. The display panel of claim 2, wherein each of the unit blocks includes four outer spacers.

4. The display panel of claim 2, wherein the unit blocks are arranged along a plurality of closed loops in the peripheral area.

5. The display panel of claim 4, wherein the unit blocks of a first closed loop is disposed between the unit blocks of a second closed loop adjacent to the first closed loop.

6. The display panel of claim 1, wherein the diameter of the outer spacers ranges from about 3 μm to about 5 μm.

7. The display panel of claim 1, wherein the outer spacers are made of a material including an organic polymer.

8. The display panel of claim 1, wherein the outer spacers are made of a material including divinyl benzene.

9. The display panel of claim 1, wherein the outer spacers are spaced apart from the seal line by a separation distance of about 8 μm to about 10 μm.

10. The display panel of claim 1, further comprising a plurality of inner spacers disposed in the display area, the inner spacers maintaining a cell gap between the first and second substrates.

11. The display panel of claim 10, wherein the inner spacers are correspondingly formed to the thin film transistors.

12. The display panel of claim 10, wherein the inner spacers are grouped by a desired number to form a plurality of unit blocks, and the unit blocks are disposed in the display area in a matrix shape.

* * * * *